(12) United States Patent
Hijikata (10) Patent No.: US 9,614,470 B2
(45) Date of Patent: Apr. 4, 2017

(54) MOTOR CURRENT CONTROLLER AND METHOD FOR CONTROLLING MOTOR CURRENT

(71) Applicant: MINEBEA CO., LTD., Kitasaku-gun, Nagano (JP)

(72) Inventor: Hidetoshi Hijikata, Hamamatsu (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 15/003,282

(22) Filed: Jan. 21, 2016

(65) Prior Publication Data

US 2016/0218648 A1    Jul. 28, 2016

(30) Foreign Application Priority Data

Jan. 22, 2015  (JP) ................................. 2015-010404

(51) Int. Cl.
*H02P 8/12* (2006.01)
*H02M 7/48* (2007.01)

(52) U.S. Cl.
CPC ..................................... *H02P 8/12* (2013.01)

(58) Field of Classification Search
USPC .......................... 318/280, 287, 291, 293, 294
See application file for complete search history.

(56) References Cited

U.S. PATENT DOCUMENTS

| | | | | |
|---|---|---|---|---|
| 6,847,531 B2* | 1/2005 | Bixel | ................. | H02M 5/4585 363/65 |
| 6,995,537 B1* | 2/2006 | Plutowski | ............. | H02P 25/034 318/400.04 |
| 7,755,312 B2* | 7/2010 | Hirata | ...................... | H02P 6/26 318/400.13 |
| 2004/0189229 A1* | 9/2004 | Nadd | ................... | H02H 7/0838 318/434 |

FOREIGN PATENT DOCUMENTS

JP    2002-204150 A    7/2002

* cited by examiner

*Primary Examiner* — Bentsu Ro
(74) *Attorney, Agent, or Firm* — Carrier Blackman & Associates, P.C.; Joseph P. Carrier; William D. Blackman (57) ABSTRACT

A motor current controller includes: an H-bridge circuit that includes a switching element and is connected to a motor coil provided in a motor; and a control unit that drives the switching element every PWM cycle and designates an operation mode from among a plurality of modes including a charge mode, in which a motor current flowing in the motor coil increases, and a decay mode, in which the motor current is decreased for the H-bridge circuit. The control unit operates to select the decay mode as the operation mode with higher priority during a period in which the PWM cycle ends after the maximum duty time elapses from the start of each PWM cycle.

7 Claims, 9 Drawing Sheets

MOTOR CURRENT CONTROLLER AND METHOD FOR CONTROLLING MOTOR CURRENT

BACKGROUND OF THE INVENTION

1. Field of the Invention

The present invention relates to a motor current controller and a method for controlling motor current which are suitable to be implemented for controlling a stepping motor.

2. Description of the Related Art

In JP-A-2002-204150, a technique of driving a stepping motor by PWM control is described. According to this technique, control of a "charge mode", a "fast decay mode", and a "slow decay mode" is repeated for each PWM cycle. Here, the charge mode is an operation mode in which a current supplied to a stator winding increases, the fast decay mode is an operation mode in which the current is decreased at a high speed, and the slow decay mode is an operation mode in which the current is decreased at a low speed. In the following description, the fast decay mode and the slow decay mode may are both simply referred to as a "decay mode".

These operation modes are switched to one another based on a comparison result of a target current value (for example, a waveform which is obtained by approximating a sine wave using a stepwise wave) supplied to the stepping motor with a measured current value. That is, the charge mode can be selected when the measured current value is equal to or less than the target current value, and the decay mode can be selected when the measured current value is greater than the target current value. However, in any operation mode, it is difficult to predict the waveform of the measured current value in advance. A current waveform in the charge mode varies depending on a drive voltage of the motor, a rotation speed of the motor, a load torque condition of the motor, a temperature environment, and the like.

Since inductance of the stator winding varies depending on a positional relationship of a rotor and a stator, a decay speed of a current in the decay mode also varies depending on the positional relationship. When the measured current value departs from the prediction and, for example, a phenomenon in which the measured current value greatly drops occurs, ripples of the current waveform increase to compensate for the drop. Accordingly, torque loss, vibration, noise, or the like of the motor occurs and frequent switching of a coil voltage and current-supply direction between the charge mode and the fast decay mode may cause electromagnetic noise.

In order to cope with this problem, in the technique described in JP-A-2002-204150, two comparators are provided to compare the measured current value with two reference values and the operation mode is switched based on the comparison result and/or the time. In another technique, the ripples are suppressed by shortening the PWM cycle.

However, providing two comparators as described in JP-A-2002-204150 causes an increase in cost. Also, shortening the PWM cycle requires a controller to be capable of coping with a high-speed operation, and thus also causes an increase in cost.

SUMMARY OF THE INVENTION

One of objects of the present invention is to provide a motor current controller and a method for controlling motor current which can enhance target value followability of a motor current with a low cost.

According to an illustrative embodiment of the present invention, there is provided a motor current controller including: an H-bridge circuit that includes a switching element and diode and is connected to a motor coil provided in a motor; and a control unit that drives the switching element every PWM cycle and designates an operation mode from among a plurality of modes including a charge mode, in which a motor current flowing in the motor coil increases, and a decay mode, in which the motor current is decreased for the H-bridge circuit. The control unit includes: an operation mode selector that selects the decay mode as the operation mode when the motor current is equal to or greater than a reference current value in a period in which a predetermined maximum duty time elapses after each PWM cycle starts; an invalidator that sets, as an invalidation period, a period from a time point at which a first predetermined time elapses after the first PWM cycle starts to a time point at which a second predetermined time elapses after the subsequent second PWM cycle starts, during which the selection of the decay mode by the operation mode selector is disabled; a charge mode designator that designates the operation mode to the charge mode during the invalidation period; and a maximum duty time designator that selects the decay mode as the operation mode with higher priority over the operations of the invalidator and the charge mode designator during a period in which the PWM cycle ends after the maximum duty time elapses from the start of each PWM cycle.

According to another illustrative embodiment of the present invention, there is provided a method for controlling motor current of a motor current controller having an H-bridge circuit that includes a switching element and is connected to a motor coil provided in a motor and a control unit that drives the switching element every PWM cycle and designates an operation mode from among a plurality of modes including a charge mode, in which a motor current flowing in the motor coil increases, and a decay mode, in which the motor current is decreased for the H-bridge circuit. The method includes: selecting the decay mode as the operation mode when the motor current is equal to or greater than a reference current value in a period in which a predetermined maximum duty time elapses after each PWM cycle starts; setting, as an invalidation period, a period from a time point at which a first predetermined time elapses after the first PWM cycle starts to a time point at which a second predetermined time elapses after the subsequent second PWM cycle starts, during which the selection of the decay mode is disabled; designating the operation mode to the charge mode during the invalidation period; and selecting the decay mode as the operation mode with higher priority over invalidation of the decay mode and the designation of the charge mode during a period in which the PWM cycle ends after the maximum duty time elapses from the start of each PWM cycle.

According to still another illustrative embodiment of the present invention, there is provided a motor current controller including: an H-bridge circuit that includes a switching element and is connected to a motor coil provided in a motor; and a controller that drives the switching element every PWM cycle and designates an operation mode from among a plurality of modes including a charge mode, in which a motor current flowing in the motor coil increases, and a decay mode, in which the motor current is decreased for the H-bridge circuit. The controller is configured to perform a series of process including: selecting the decay mode as the operation mode when the motor current is equal to or greater than a reference current value in a period in which a predetermined maximum duty time elapses after each PWM cycle starts; setting, as an invalidation period, a period from a time point at which a first predetermined time elapses after the first PWM cycle starts to a time point at which a second predetermined time elapses after the subsequent second PWM cycle starts, during which the selection of the decay mode is disabled; designating the operation mode to the charge mode during the invalidation period; and selecting the decay mode as the operation mode with higher priority over invalidation of the decay mode and the designation of the charge mode during a period in which the PWM cycle ends after the maximum duty time elapses from the start of each PWM cycle.

DETAILED DESCRIPTION

Figure 1:
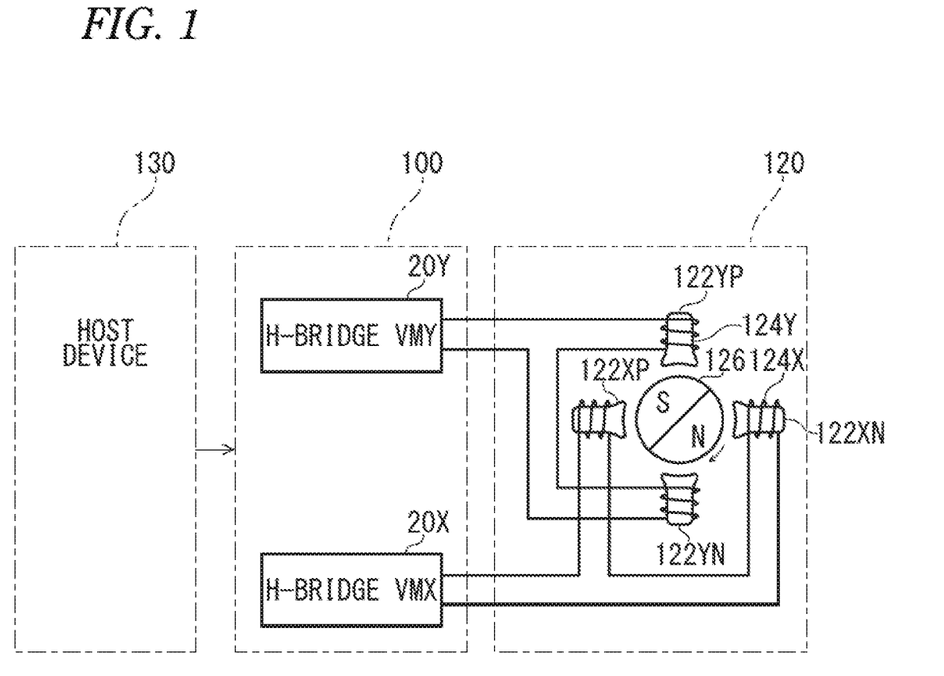
FIG. 1 is a block diagram illustrating an entire configuration of a motor control system according to a first embodiment of the present invention.

Hereinafter, an entire configuration of a motor control system according to a first embodiment of the present invention will be described with reference to FIG. 1. As shown in FIG. 1, a stepping motor 120 is a bipolar two-phase stepping motor including a rotor 126 including a permanent magnet and formed to be rotatable and stators formed at four section positions in the circumferential direction of the rotor 126. The stators include X-phase stators 122XP and 122XN and Y-phase stators 122YP and 122YN. A winding is wound on each stator. The windings wound on the stators 122YP and 122YN are connected in series and both windings are referred to as a "stator winding 124Y"). Similarly, the windings wound on the stators 122XP and 122XN are connected in series and both windings are referred to as a "stator winding 124X".

A host device 130 outputs a speed command signal indicating a rotation speed of the motor 120. A motor current controller 100 controls driving of the motor 120 in accordance with the speed command signal. The motor current controller 100 is provided with H-bridge circuits 20X and 20Y and applies an X-phase voltage VMX and a Y-phase voltage VMY to the stator windings 124X and 124Y.

Details of the motor current controller 100 will be described below with reference to FIG. 2. In FIG. 1, two sets of stator windings 124X and 124Y and two sets of H-bridge circuits 20X and 20Y are shown. However, in FIG. 2, these H-bridges are collectively shown as only one set of stator winding 124 and one set of H-bridge circuit 20.

A central processing unit (CPU) 101 provided in the motor current controller 100 controls units via a bus 106 based on a control program stored in a read only memory (ROM) 103. A random access memory (RAM) 102 is used as a work memory of the CPU 101. A timer 104 measures an elapsed time from a reset timing under the control of the CPU 101. An I/O port 105 transmits and receives a signal between the host device 130 illustrated in FIG. 1 or an external device. A bridge controller 107 includes various modules such as an operation mode selector, an invalidator, a charge mode designator, and a maximum duty time designator and such modules may be implemented by causing the CPU to execute the control program. The bridge controller 107 controls a bridge control circuit 110 based on a command from the CPU 101. A current limit controller 112 controls a PWM signal generator 113 to limit a current as necessary.

The bridge control circuit 110 is configured as a single integrated circuit. The PWM signal generator 113 provided in the bridge control circuit 110 generates and supplies a PWM signal to the H-bridge circuit 20 under the control of the bridge controller 107. The H-bridge circuit 20 includes field effect transistors (FETs) 2, 4, 6, 8, 15, and 17, and the PWM signal is an ON/OFF signal which is applied as a gate voltage to the FETs. In the drawing, a lower terminal of each FET is a source terminal and an upper terminal thereof is a drain terminal.

The FETs 2 and 4 are connected in series, and the series circuit is connected to a DC power source 140 and a ground line 142 and is supplied with a predetermined voltage Vdd. Similarly, the FETs 6 and 8 are connected in series, and the series circuit is supplied with the voltage Vdd. Diodes 12, 14, 16, and 18 are reflux diodes and are connected in parallel to the FETs 2, 4, 6, and 8. The FETs 15 and 17 are formed to detect a current and constitute current mirror circuits along with the FETs 4 and 8, respectively. Accordingly, currents proportional to the currents flowing in the FETs 4 and 8 flow in the FETs 15 and 17, respectively.

A voltage VMout0 of a connection point between the FETs 2 and 4 is applied to one end of the stator winding 124 of the motor 120. A voltage VMout1 of a connection point between the FETs 6 and 8 is applied to the other end of the stator winding 124. Accordingly, a motor voltage VM (=voltage VMout0−VMout1) which is a difference therebetween is applied to the stator winding 124. The motor voltage VM actually includes an X-phase voltage VMX and a Y-phase voltage VMY illustrated in FIG. 1.

The voltages VMout0 and VMout1 are also supplied to an A/D converter 117 and a back electromotive force (BEMF) detector 118. The BEMF detector 118 outputs a flag ZC in response to switching of a voltage direction (zero cross) when the motor voltage VM is a back electromotive force, that is, in a period in which a voltage is not applied from the H-bridge circuit 20. The A/D converter 117 measures and outputs the back electromotive force Vbemf of the stator winding 124 based on the voltages VMout0 and VMout1. The back electromotive force Vbemf is used to detect loss of synchronism.

A current detector 116 outputs a measured current value Icoil of the current flowing in the stator winding 124 by measuring the current value flowing in the FETs 15 and 17 depending on the current direction. A D/A converter 115 receives a digital value of a reference current value Iref from the bridge controller 107 and converts the received digital value into an analog value. A comparator 114 compares the measured current value Icoil as an analog value with the reference current value Iref and outputs the comparison result as a comparison signal CMP. The comparison signal CMP is a signal which is "1" when the measured current value Icoil is equal to or greater than the reference current value Iref and is "0" otherwise.

Chattering may occur in the comparison signal CMP output from the comparator 114 due to an influence of noise or the like. A current filter 111 outputs a result from which the chattering is excluded as a threshold excess flag CL. The bridge controller 107 outputs a current control enable flag CLM. This flag CLM is a flag indicating whether current control (an operation mode other than the charge mode) is allowed. That is, the current control enable flag CLM is set to "1" when an operation mode other than the charge mode is enabled and is set to "0" when an operation other than the charge mode is not enabled.

Figure 3:
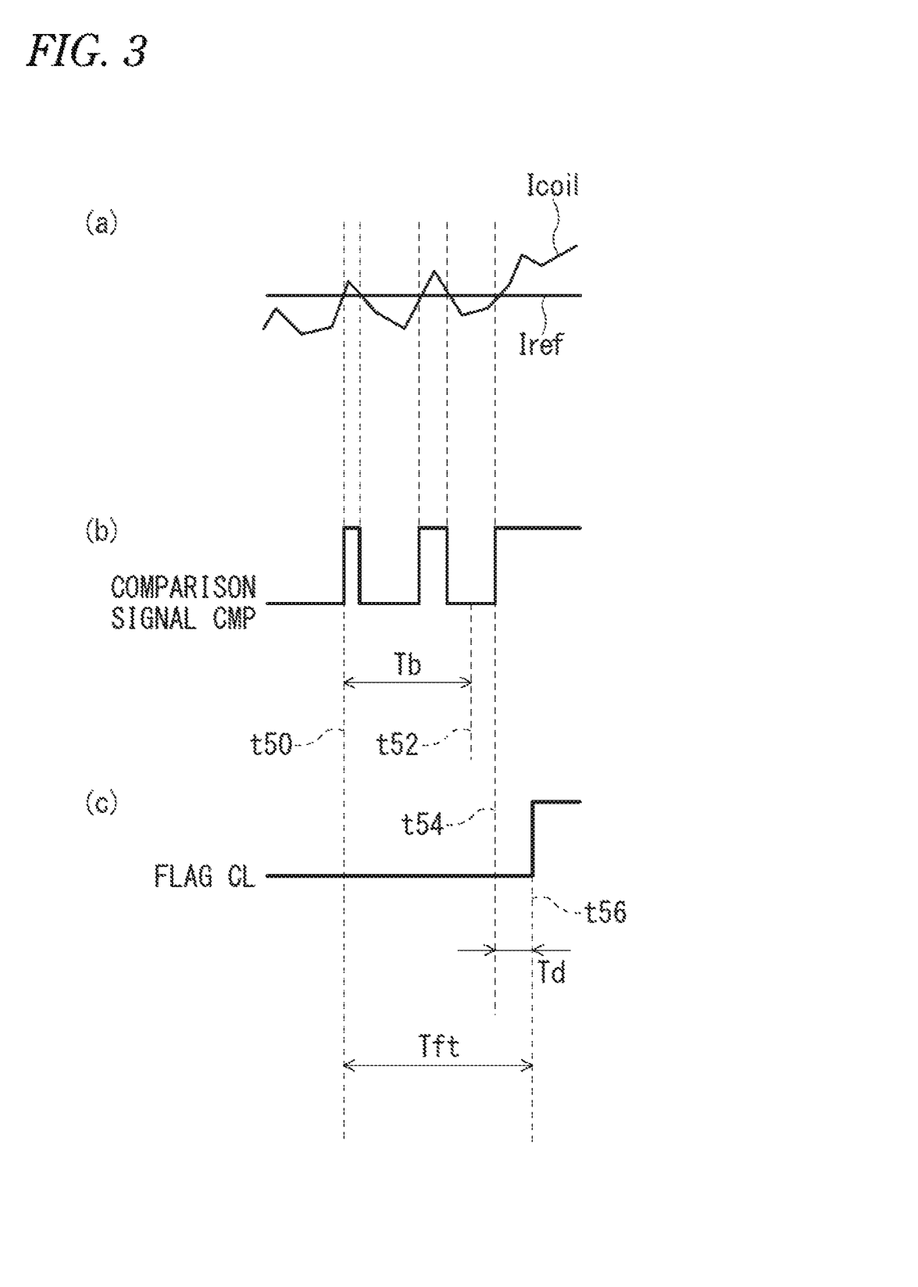
FIG. 3 is a waveform diagram of a comparator and a current filter.

Details of the operation of the current filter 111 will be described below with reference to sections (a) to (c) of FIG. 3. Section (a) of FIG. 3 illustrates an example of waveforms of the measured current value Icoil and the reference current value Iref and noise is superimposed on the measured current value Icoil. Accordingly, as illustrated in section (b) of FIG. 3, chattering occurs in the comparison signal CMP. The current filter 111 waits for a predetermined blank time Tb from the timing at which the comparison signal CMP is first changed to a value A (where the value A is "1" or "0"), and determines whether the value of the comparison signal CMP is held at the value A ("1" in this case). In the illustrated example, it is determined whether the comparison signal CMP is held at "1" at time t52 at which the blank time Tb elapses after the comparison signal CMP first rises to "1" at time t50.

When the determination result is negative, the current filter 111 waits until the comparison signal CMP is returned to the value A. In the illustrated example, the current filter 111 waits up to time t54 at which the comparison signal CMP is returned to "1". When the comparison signal CMP is equal to the value A, the current filter 111 additionally waits for a predetermined deglitch time Td and then sets the threshold excess flag CL to the value A. In the example illustrated in section (c) of FIG. 3, the threshold excess flag CL rises to "1" at time t56 at which the deglitch time Td elapses from time t54. The period of time from the timing at which the comparison signal CMP is changed to the value A to the timing at which the threshold excess flag CL is first set to the value A is referred to as a "filter time Tft".

In the illustrated example, the filter time Tft is the sum of the blank time Tb, the deglitch time Td, and the period from time t52 to time t54 and thus is not constant. Here, the blank time Tb and the deglitch time Td may be set to "0". When the deglitch time Td is set to "0", the filter time Tft is equal to the period from time t50 to time t54 in the examples illustrated in (a) to (c) of FIG. 3. When the blank time Tb is set to "0", the filter time Tft is equal to the deglitch time Td and is a constant value.

Figures 4A, 4B:
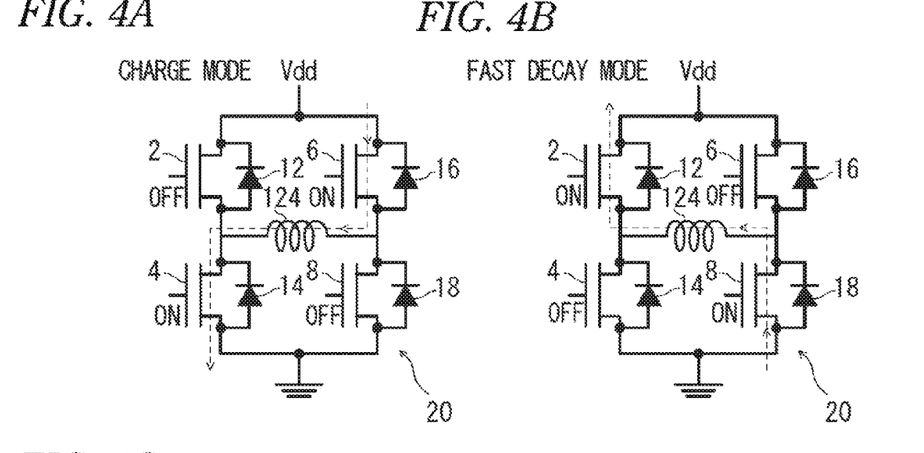
FIGS. 4A to 4F are diagrams illustrating operation modes of an H-bridge circuit.

The operation mode of the H-bridge circuit 20 will be described below with reference to FIGS. 4A to 4F. When the absolute value of the motor current flowing in the stator winding 124 increases, two FETs facing each other diagonally are switched to the ON state as illustrated in FIG. 4A. In the illustrated example, the FETs 4 and 6 are in the ON state and the FETs 2 and 8 are in the OFF state. In this state, the motor current flows in the direction indicated by a broken line via the FET 6, the stator winding 124, and the FET 4, and the motor current increases. This operation mode is referred to as a "charge mode".

When the motor current is decreased at a high speed from the state illustrated in FIG. 4A, the FETs 4 and 6 are switched to the OFF state and the FETs 2 and 8 are switched to the ON state as illustrated in FIG. 4B. Since a back electromotive force is generated in the stator winding 124, a current flows in the direction indicated by the broken line via the FET 8, the stator winding 124, and the FET 2 and the current is decreased at a high speed. This operation mode is referred to as a "fast decay mode".

Figures 4C, 4D:
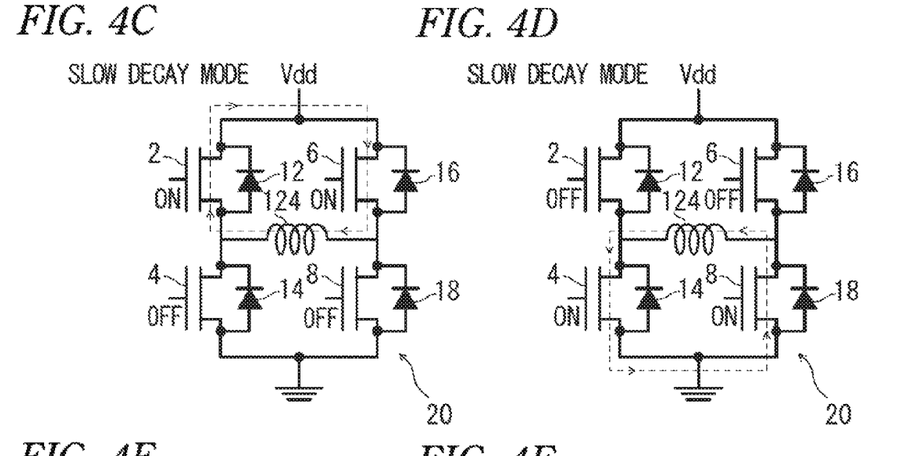

When the current is decreased at a low speed from the states illustrated in FIGS. 4A and 4B, the FETs 2 and 6 on the voltage Vdd side are switched to the ON state and the FETs 4 and 8 on the ground potential side are switched to the OFF state as illustrated in FIG. 4C. Then, as indicated by the broken line, current flows to loop around the FETs 2 and 6 and the stator winding 124. This current is decreased by the impedance of the FETs 2 and 6 and the stator winding 124, but the decay speed is low. This operation mode is referred to as a "slow decay mode".

As a variation of the slow decay mode, the FETs 2 and 6 on the voltage Vdd side may be set to the OFF state and the FETs 4 and 8 on the ground potential side may be set to the ON state as illustrated in FIG. 4D. Then, as indicated by the broken line in the drawing, the motor current flows to loop around the FETs 4 and 8 and the stator winding 124. This current is decreased by the impedance of the FETs 4 and 8 and the stator winding 124, but the decay speed is low.

Even when the gate voltage of any FET is set to the OFF state, the FET stays in the ON state for a while due to the parasitic capacitance of the FET. Accordingly, for example, when the operation mode is instantaneously switched from the charge mode (FIG. 4A) to the fast decay mode (FIG. 4B), all the FETs are instantaneously set to the ON state and the voltage Vdd and the ground potential are short-circuited to break down the FETs. In order to prevent this situation, the H-bridge circuit 20 is set to an operation mode called a "shoot through protection mode".

Figures 4E, 4F:
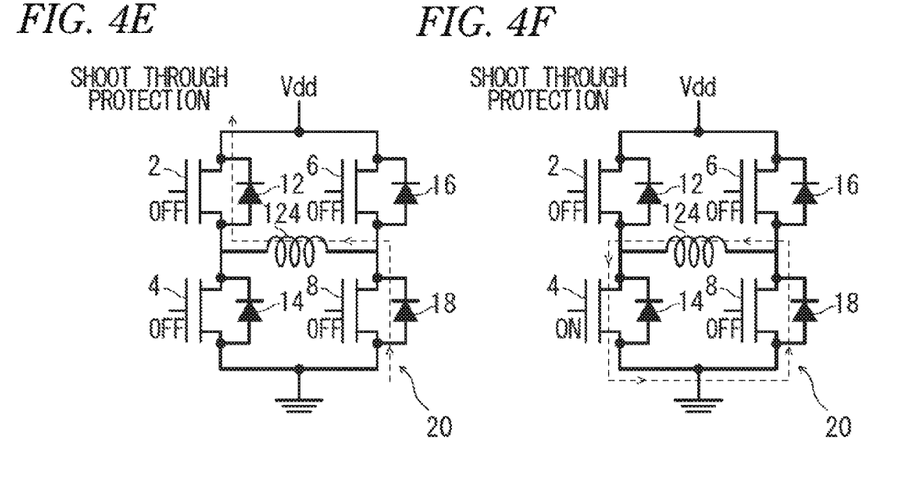

FIG. 4E illustrates a shoot through protection mode in which all the FETs 2, 4, 6, and 8 are turned off. When the operation mode is switched from the charge mode illustrated in FIG. 4A to the shoot through protection mode illustrated in FIG. 4E, a back electromotive force is generated in the stator winding 124 and thus the motor current flows in the direction indicated by a broken line via the diode 18, the stator winding 124, and the diode 12. In the shoot through protection mode illustrated in FIG. 4E, since power loss occurs due to forward voltage drop of the diodes 12 and 18, the decay speed of the motor current is the highest.

When the charge mode illustrated in FIG. 4A and the slow decay mode illustrated in FIG. 4D are compared, the FET 4 is in the ON state in any mode. Accordingly, when the operation mode is switched from the state illustrated in FIG. 4A to the state illustrated in FIG. 4D, it does not cause any problem that the FET 4 is held in the ON state. Therefore, in this case, the shoot through protection mode in which the FET 4 is set to the ON state and the FETs 2, 6, and 8 are set to the OFF state can be employed as illustrated in FIG. 4F. In this case, the motor current flows to loop around the FET 4, the diode 18, and the stator winding 124 as indicated by the broken line in the drawing.

In the state illustrated in FIG. 4F, since power loss due to the forward voltage drop of the diode 18 is generated, the decay speed is higher than that in the slow decay mode, but the decay speed is much lower than that in the fast decay mode or the shoot through protection mode illustrated in FIG. 4E. When the operation mode is switched from the charge mode or the fast decay mode to the slow decay mode, it means that "it is not intended to greatly decrease the motor current", and thus the shoot through protection mode in which only one FET is set to the ON state is selected as illustrated in FIG. 4F.

Figure 2:
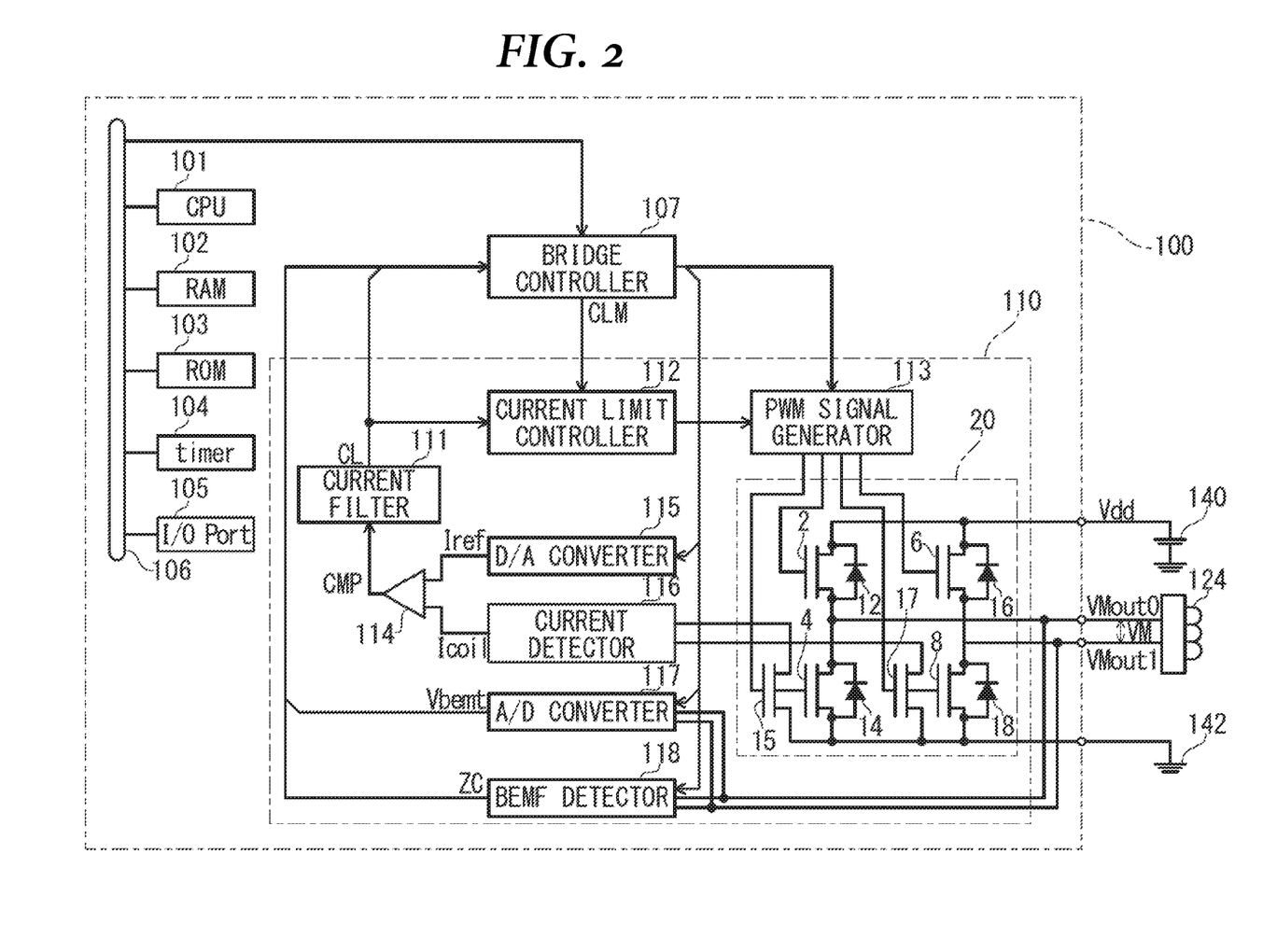
FIG. 2 is a block diagram illustrating a detailed configuration of a motor current controller.

In FIG. 2, the operation mode which is designated from the bridge controller 107 from the CPU 101 is one of the charge mode, the slow decay mode, and the fast decay mode, and the shoot through protection mode is not explicitly designated in a control program to be described later. However, the bridge controller 107 does not immediately reflect the designated operation mode but controls the PWM signal generator 113 by necessarily inserting the shoot through protection mode (FIG. 4E or 4F) therebetween.

Figure 5A:
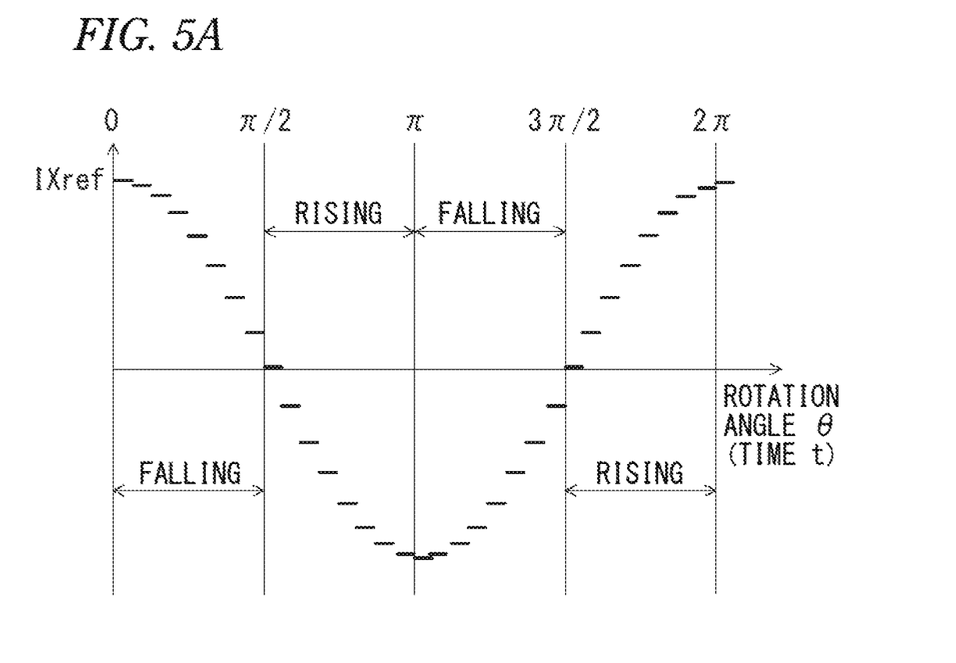
FIGS. 5A and 5B are waveform diagrams of a reference current value with respect to a rotation angle of a motor.
Figure 5B:
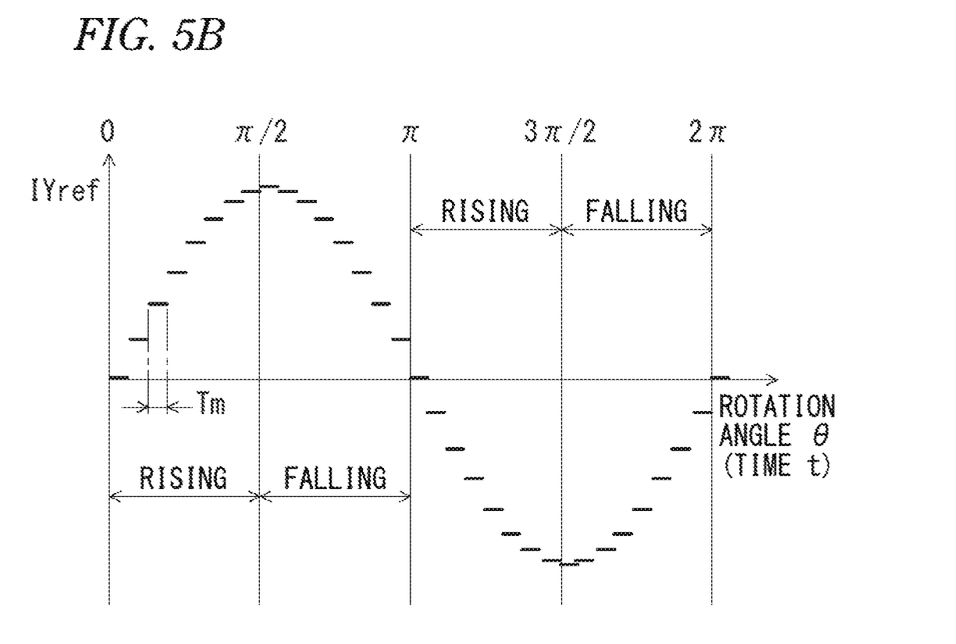

In FIG. 2, the reference current value Iref supplied from the bridge controller 107 to the D/A converter 115 actually includes an X-phase reference current value IXref and a Y-phase reference current value IYref. Setting examples of the reference current values IXref and IYref in one turn of the stepping motor 120, that is, in a range in which the rotation angle θ ranges from 0 to 2π, are illustrated in FIGS. 5A and 5B. As illustrated in the drawings, the reference current values IXref and IYref have waveforms obtained by approximating a cosine curve and a sine curve using a stepwise wave. A system in which the reference current value is determined in this way to drive the motor 120 is referred to as a micro-step system and has features of small residual vibration and excellent stability particularly at the time of low-speed rotation.

A cycle in which the stepwise wave varies is referred to as a micro-step cycle Tm. It is preferable that the micro-step cycle Tm be equal to the PWM cycle or an integral multiple thereof. In the reference current values IXref and IYref, a rising side and a falling side are alternately repeated every π/2 of the rotation angle θ as illustrated in the drawings. Here, the "rising side" is a period in which the absolute values of the reference current values IXref and IYref rise and the "falling side" is a period in which the absolute values fall.

Figure 6:
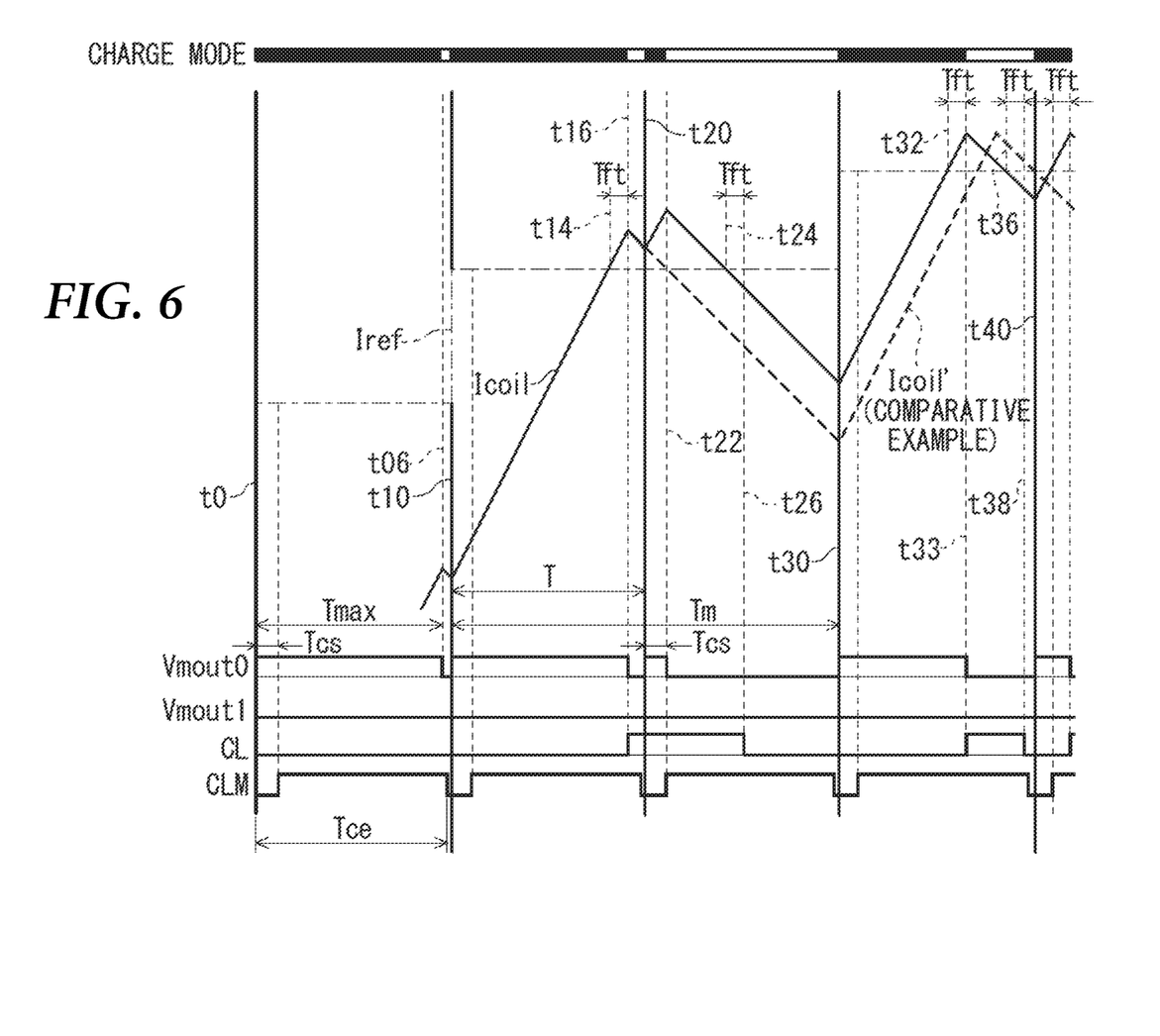
FIG. 6 is a waveform diagram in a current rising side.

The current control in the rising side will be described below in brief with reference to the waveform diagram illustrated in FIG. 6. In FIG. 6, times t0, t10, t20, t30, and t40 are a start time of a PWM cycle T. The micro-step cycle Tm is double the PWM cycle T in the illustrated example and the reference current value Iref varies every micro-step cycle Tm. In FIG. 6, the waveforms of the voltages VMout0 and VMout1, the threshold excess flag CL, and the current control enable flag CLM are also illustrated. In the uppermost part in which the "charge mode" is written, periods in which the operation mode is the charge mode are indicated by black lines and other periods are indicated by white lines.

Before time t06 in FIG. 6, since the measured current value Icoil is less than the reference current value Iref and the threshold excess flag CL is "0", the operation mode of the H-bridge circuit 20 is set to the charge mode (see FIG. 4A) and the measured current value Icoil increases with the lapse of time. However, at time t06, the flag CL is held at "0" but the operation mode is switched to the slow decay mode. In this embodiment, the slow decay mode is necessarily selected as the decay mode in the rising side, but the fast decay mode (see FIG. 4B) is not selected.

Here, the reason for switching the operation mode to the slow decay mode at time t06 will be described below. In this embodiment, the period in which the operation mode can be set to the charge mode is limited to the period from the time point at which each PWM cycle starts to the time point at which a predetermined maximum duty time Tmax expires. Since time t06 is a time point at which the maximum duty time Tmax elapses from time t0 at which the PWM cycle starts, the operation mode can be switched to the slow decay mode regardless of the value of the threshold excess flag CL. Here, the reason for providing the maximum duty time Tmax is to suppress noise in an audible frequency range. Details thereof will be described below.

When the charge mode and the decay mode are repeated every PWM cycle, the motor 120 vibrates in the PWM cycle. When the vibration cycle falls in an audible frequency range, the vibration becomes strident noise and is heard by a human being, and thus the PWM cycle is set to be shorter than the audible frequency range. However, when a PWM cycle in which the charge mode is set over the entire period appears, noise appears as a component which is an integral multiple of the PWM cycle in the vibration and thus the noise is heard by a human being. Therefore, in order to prevent such a situation, the period in which the operation mode can be set to the charge mode is limited to the period from the time point at which each PWM cycle starts to the time point at which the maximum duty time Tmax expires as described above.

At times t10 to t14, the H-bridge circuit 20 is set to the charge mode again and the measured current value Icoil increases with the lapse of time. The measured current value Icoil at time t14 is equal to the reference current value Iref. However, as described with reference to FIG. 3, since the current filter 111 excludes the chattering, the threshold excess flag CL is switched when the filter time Tft passes after the output signal of the comparator 114 is switched. Accordingly, in FIG. 6, the threshold excess flag CL rises to "1" at time t16 at which the filter time Tft elapses from time t14.

When the threshold excess flag CL rise to "1", the operation mode of the H-bridge circuit 20 is switched to the slow decay mode (see FIG. 4D) in principle. This is because the measured current value Icoil follows the reference current value Iref. Accordingly, at time t16, the operation mode is switched to the slow decay mode based on the principle.

Then, when a next PWM cycle starts at time t20, the threshold excess flag CL is "1", but the operation mode is switched to the charge mode and the measured current value Icoil increases in the period of times t20 to t22. The reason will be described below. In this embodiment, the current control enable flag CLM is set to "0" until a predetermined current control invalidation time Tcs elapses after each PWM cycle starts. That is, in this period, since an operation mode other than the charge mode is not enabled, the operation mode of the H-bridge circuit 20 is held in the charge mode. The period of times t20 to t22 corresponds to the current control invalidation time Tcs.

One reason for providing the current control invalidation time Tcs is the same as providing the maximum duty time Tmax. That is, when a PWM cycle in which the slow decay mode is set over the entire period appears, noise appears as a component which is an integral multiple of the PWM cycle in the vibration and thus the noise is heard by a human being. Therefore, in order to prevent such a situation, the charge mode is necessarily selected in the predetermined current control invalidation time Tcs as described above when each PWM cycle starts. Another reason for providing the current control invalidation time Tcs is to decrease a delay at the time of start of the measured current value Icoil and to suppress ripples of the current waveform. Details thereof will be described later.

At time t22 at which the time Tcs elapses, since the threshold excess flag CL is "1", the operation mode is switched to the slow decay mode and the measured current value Icoil is decreased. The measured current value Icoil is less than the reference current value Iref at time t24, and the threshold excess flag CL falls to "0" at time 26 at which the filter time Tft elapses additionally.

In the example illustrated in FIG. 6, the current control enable flag CLM falls to "0" at the timing immediately before each PWM cycle ends. The period of time until the current control enable flag CLM falls to "0" after each PWM cycle starts is referred to as a current control re-invalidation time Tce. Here, the operation of setting the operation mode to the slow decay mode based on the maximum duty time Tmax has priority to the operation based on the current control enable flag CLM.

In the example illustrated in FIG. 6, the current control re-invalidation time Tce is larger than the maximum duty time Tmax. Accordingly, when the operation mode is set to the slow decay mode due to the lapse of the maximum duty time Tmax, the setting of the current control enable flag CLM to "0" in the current control re-invalidation time Tce does not affect the operation in the PWM cycle. As a result, at the period of times t16 to t20, the operation mode is held in the slow decay mode even when the current control enable flag CLM falls to "0".

At time t30, when a next PWM cycle starts, the operation mode is set to the charge mode again and the measured current value Icoil increases. At time t30, a new micro-step cycle Tm starts and the reference current value Iref is set to a higher value. When the measured current value Icoil is equal to the reference current value Iref at time t32, the threshold excess flag CL rises to "1" at time t33 at which the filter time Tft elapses from the time point.

Accordingly, the operation mode is switched to the slow decay mode. Thereafter, when the measured current value Icoil becomes equal to the reference current value Iref at time t36, the threshold excess flag CL falls to "0" at time t38 at which the filter time Tft elapses from the time point. In this way, when the maximum duty time Tmax is shorter than the current control re-invalidation time Tce, the above-mentioned operations are repeated in the rising side.

As a comparative example, the measured current value Icoil' when the control based on the current control enable flag CLM is "not performed" is indicated by a broken line. In this comparative example, since the operation mode is not switched to the charge mode at time t20, the current waveform falls greatly. That is, since the ripples of the current waveform are enlarged, torque loss, vibration, noise, and electromagnetic noise of the motor 120 increase. On the contrary, according to this embodiment, since the current control re-invalidation time Tce is provided at the time of start of each PWM cycle and the operation mode is set to the charge mode, it is possible to decrease a delay of the first start of the measured current value Icoil. Particularly, a remarkable effect can be exhibited in a period (for example, a period in which the rotation angle θ ranges from $\pi/2$ to $3\pi/4$ and ranges from $3\pi/2$ to $7\pi/4$)) in which the reference current value Iref rises steeply.

Figure 7:
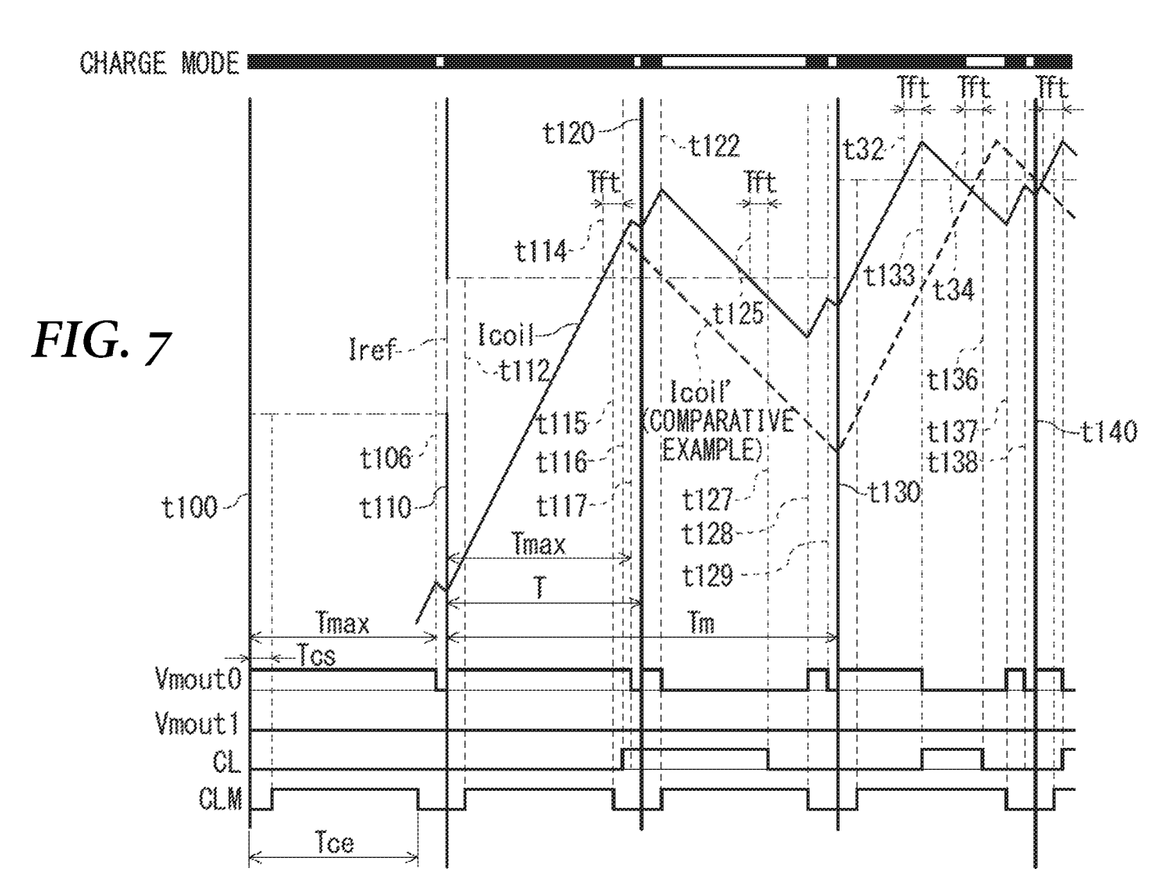
FIG. 7 is a waveform diagram (another aspect) in a current rising side.

Another aspect of the current control in the rising side will be described below with reference to the waveform diagram illustrated in FIG. 7. In FIG. 7, times t100, t110, t120, t130, and t140 are a start time of a PWM cycle T and the micro-step cycle Tm is double the PWM cycle T. This specific example is different from the specific example illustrated in FIG. 6, in that the current control re-invalidation time Tce is longer than the maximum duty time Tmax in FIG. 6, but the current control re-invalidation time Tce is shorter than the maximum duty time Tmax in FIG. 7.

Before time t106 in FIG. 7, the operation mode of the H-bridge circuit 20 is set to the charge mode, and the operation mode is switched to the charge mode again at time t106 at which the maximum duty time Tmax elapses after the PWM cycle starts. When a new PWM cycle starts at time t110, the operation mode is set to the charge mode again, and the measured current value Icoil increases with the lapse of time. The measured current value Icoil becomes equal to the reference current value Iref at time t114, and the threshold excess flag CL rises to "1" at time t116 at which the filter time Tft elapses additionally.

However, since the current control enable flag CLM falls to "0" at time t115 before time t116, the charge mode is held at time t116. Thereafter, when the maximum duty time Tmax expires at time t117, the operation mode is switched to the slow decay mode. This is because the operation of setting the operation mode to the slow decay mode in the maximum duty time Tmax has priority to the operation based on the value of the current control enable flag CLM as described above.

Then, when a new PWM cycle starts at time t120, the current control enable flag CLM is "0" up to time t122 corresponding to the current control invalidation time Tcs, and thus the operation mode in the period is set to the charge mode. At time t122, the threshold excess flag CL is "1" and thus the operation mode is switched to the slow decay mode. Thereafter, the measured current value Icoil becomes equal to the reference current value Iref at time t125, and the threshold excess flag CL falls to "0" at time t127 at which the filter time Tft elapses from the time point. Thereafter, when the current control enable flag CLM falls "0" at time t128 at which the current control re-invalidation time Tce elapses, the operation mode is switched to the charge mode, and the operation mode can be switched to the slow decay mode again at time t129 at which the maximum duty time Tmax elapses.

When a next PWM cycle starts at time t130, the operation mode is set to the charge mode again, and the measured current value Icoil increases. At time t130, a new micro-step cycle Tm also starts and the reference current value Iref is set to a higher value. When the measured current value Icoil becomes equal to the reference current value Iref at time t132, the threshold excess flag CL rises to "1" at time t133 at which the filter time Tft elapses from the time point. Accordingly, the operation mode is switched to the slow decay mode.

Thereafter, when the measured current value Icoil becomes equal to the reference current value Iref at time t134, the threshold excess flag CL falls to "0" at time t136 at which the filter time Tft elapses from the time point. Thereafter, when the current control enable flag CLM falls to "0" at time t137 at which the current control re-invalidation time Tce elapses, the operation mode is switched to the charge mode, and the operation mode is switched to the slow decay mode again at time t138 at which the maximum duty time Tmax elapses. In this way, when the maximum duty time Tmax is longer than the current control re-invalidation time Tce, the above-mentioned operations are repeated in the rising side.

The measured current value Icoil' in the comparative example in which the control based on the current control enable flag CLM is "not performed" is indicated by a broken line. In this comparative example, since the operation mode is not switched to the charge mode at times t116, t120, and t128, the current waveform falls greatly. Accordingly, when the maximum duty time Tmax is set to be longer than the current control re-invalidation time Tce (FIG. 7), this embodiment can decrease a delay of the first start of the measured current value Icoil as described with reference to FIG. 6 in the comparative example.

Figure 8:
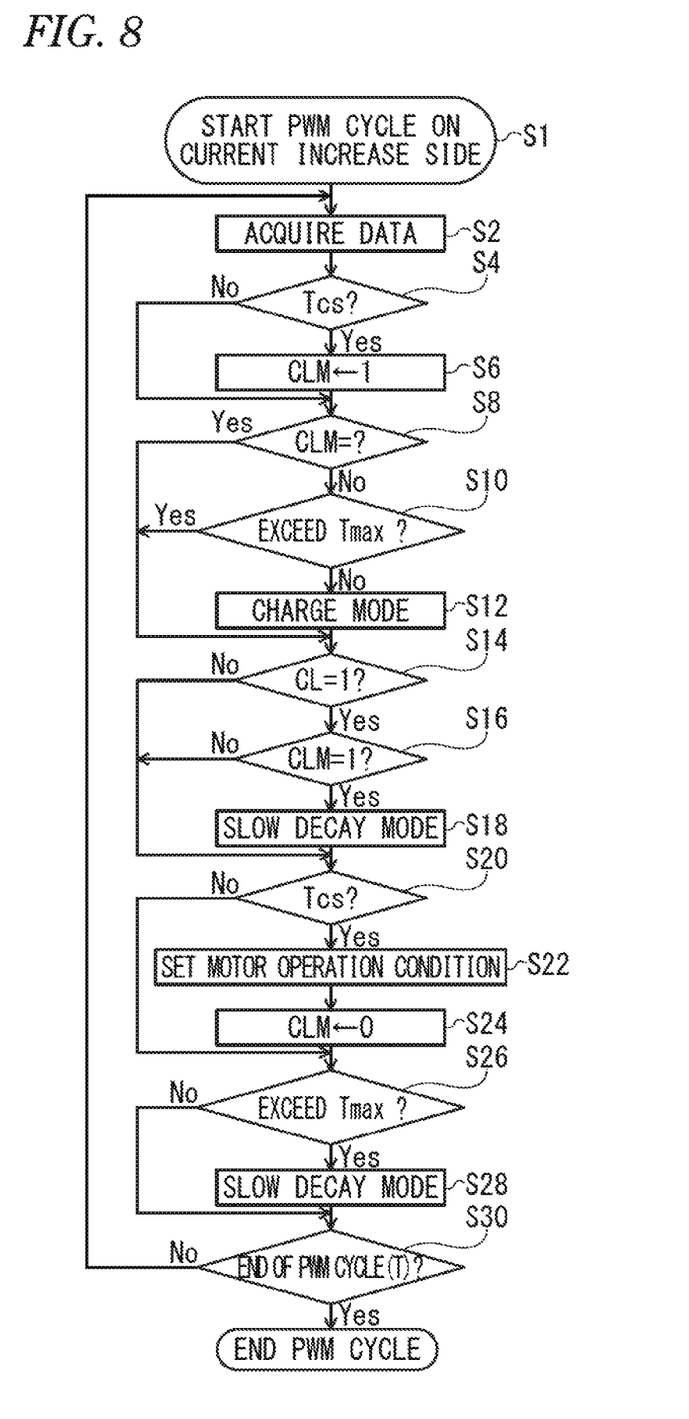
FIG. 8 is a flowchart of a current rising side control routine.

Details of the operations in the rising side will be described below with reference to FIG. 8. FIG. 8 is a flowchart of a rising side control routine which is a control program stored in the ROM 103 and performed by the CPU 101 and which is started every PWM cycle in the rising side. This routine can be applied to any of the operation examples illustrated in FIGS. 6 and 7 depending on the value set states of the current control re-invalidation time Tce, the maximum duty time Tmax, and the like.

The rising side control routine is started in step S1 of FIG. 8. At step S1, an elapsed time after a PWM cycle starts is counted after the timer 104 is reset. In step S1, the reference current value Iref (the reference current value IXref or IYref in FIGS. 5A and 5B) in the PWM cycle is determined based on the estimated value of the rotation angle θ of the rotor 126 and the waveform illustrated in FIG. 5A or 5B, and the determined reference current value Iref is set in the bridge controller 107 (see FIG. 2).

The current control enable flag CLM is set to "0" in the previous PWM cycle. The current control enable flag CLM set in the previous PWM cycle is continuously used in the present PWM cycle. In the previous PWM cycle, the current control enable flag CLM is set to "0" by performing the process of step S24 to be described later, but details of the process of step S24 will be described later.

In step S2, the elapsed time from the timer 104 and the threshold excess flag CL are acquired. In this routine, the elapsed time and the threshold excess flag CL are not changed until step S2 is performed again. Then, in step S4, it is determined whether the elapsed time after the PWM cycle starts is equal to the current control invalidation time Tcs. When the determination result is "NO", the routine proceeds to step S8 and it is determined whether the current control enable flag CLM is "1". As described above, since the current control enable flag CLM is set to "0" in the previous PWM cycle (step S24), the determination result is "NO" and the routine proceeds to step S10.

In step S10, it is determined whether the elapsed time exceeds the maximum duty time Tmax. When the determination result is "NO", the routine proceeds to step S12 and the operation mode is set to the charge mode. Then, in step S14, it is determined whether the threshold excess flag CL is "1". When the threshold excess flag CL is "1", it is determined in step S16 whether the current control enable flag CLM is "1". Since the current control enable flag CLM is set to "0" in the previous PWM cycle, the determination result is "NO" and the routine proceeds to step S20.

On the other hand, when the threshold excess flag CL is "0", the routine moves directly from step S14 to step S20. In step S20, it is determined whether the elapsed time is equal to the current control re-invalidation time Tce. When the determination result is "NO", the routine proceeds to step S26 and it is determined whether the elapsed time exceeds the maximum duty time Tmax. When the determination result is "NO", the routine proceeds to step S30 and it is determined whether the elapsed time reaches the PWM cycle. When the determination result is "NO", the routine is returned to step S2.

The same processes as described above are repeatedly performed hereinafter. Accordingly, until the elapsed time reaches the current control invalidation time Tcs, step S2 (data acquisition) and step S12 (setting to charge mode) are repeated and the operation mode is held in the charge mode.

Then, when the elapsed time becomes equal to the current control invalidation time Tcs, the determination result of step S4 is "YES" and the routine proceeds to step S6. Here, since the current control enable flag CLM is set to "1", the switching of the operation mode based on the threshold excess flag CL is enabled.

The routine in a period in which the elapsed time exceeds the current control invalidation time Tcs and then does not reach the maximum duty time Tmax and the current control re-invalidation time Tce will be described below. First, when the process of step S6 is performed, the current control enable flag CLM is set to "1", the determination result of step S8 is "YES", steps S10 and S12 are skipped, and the routine proceeds to step S14.

When the threshold excess flag CL is "0", the determination result is "NO" and the routine is returned to step S2 via steps S20, S26, and S30. That is, as long as the threshold excess flag CL is "0", the process of switching the operation mode is not performed and thus the charge mode which is the previous operation mode is held.

When the threshold excess flag CL is switched to "1", the routine proceeds to step S18 via steps S14 and S16. There, the operation mode is set to the slow decay mode. Thereafter, the process of setting the operation mode to a mode other than the slow decay mode is not performed until the elapsed time reaches the current control re-invalidation time Tce or the maximum duty time Tmax, and thus the operation mode is held in the slow decay mode.

The variation of the measured current value Icoil at times t16 and t33 in FIG. 6 and time t133 in FIG. 7 is a specific example in which the operation mode is switched to the slow decay mode based on the threshold excess flag CL after the current control invalidation time Tcs elapses and before the maximum duty time Tmax and the current control re-invalidation time Tce.

The subsequent operations vary depending on the magnitude relationship between the maximum duty time Tmax and the current control re-invalidation time Tce and thus will be described in distinguished cases. First, the operations when "Tmax≤Tce" is established (for example, FIG. 6) will be described below.

When the elapsed time exceeds the maximum duty time Tmax, the determination result of step S26 is "YES" and thus the operation mode is set to the slow decay mode in step S28. Until the elapsed time exceeds the maximum duty time Tmax and reaches the PWM cycle T, the process of step S28 is repeatedly performed and the operation mode is held in the slow decay mode.

Thereafter, when the elapsed time becomes equal to the current control re-invalidation time Tce, the determination result of step S20 is "YES" and the routine proceeds to step S22. Here, various operation conditions (for example, the estimated value of the rotation angle θ) of the motor 120 in the next PWM cycle are calculated and are set for the bridge controller 107 (see FIG. 2). Then, in step S24, the current control enable flag CLM is set to "0".

Since the current control enable flag CLM is set to "0", the determination result of step S8 is thereafter "NO", but the maximum duty time Tmax elapses and thus the determination result of step S10 is "YES". Accordingly, the process of step S12 (setting to the charge mode) is not performed. As a result, the operation mode after the maximum duty time Tmax elapses is always held in the slow decay mode, and the lapse of time to the current control re-invalidation time Tce does not particularly affect the setting of the operation mode.

When the elapsed time becomes equal to the PWM cycle T, the determination result of step S30 is "YES" and the routine ends. The variation of the measured current value Icoil at times t06 to t10 in FIG. 5 is a specific example in which the operation mode is set to the slow decay mode after the maximum duty time Tmax elapses and until the PWM cycle ends when "Tmax≤Tce" is established. The operation when "Tmax<Tce" is established is the same as when "Tmax=Tce" is established and thus "Tmax=Tce" can be set.

The operation when "Tmax>Tce" is established (for example, FIG. 7) will be described below. First, at the time point at which the elapsed time is equal to the current control re-invalidation time Tce, the determination result of step S20 is "YES" and the operation condition of the motor 120 in a next PWM cycle is set in step S22. Then, in step S24, the current control enable flag CLM is set to "0". As described above, the current control enable flag CLM set in step S24 is continuously used in the next PWM cycle.

In this way, since the current control enable flag CLM is set to "0" in step S24, the determination results of steps S8 and S10 are "NO" until the maximum duty time Tmax expires and the routine proceeds to step S12. Here, the operation mode is set to the charge mode. Until the elapsed time reaches the maximum duty time Tmax, the process of step S12 is repeatedly performed and the operation mode is held in the charge mode.

Thereafter, when the elapsed time exceeds the maximum duty time Tmax, the determination result of step S10 is "YES" and thus the process of step S12 (setting of the charge mode) is not performed. Since the determination result of step S26 is "YES" and the process of step S28 (setting of the slow decay mode) is repeatedly performed, the operation mode is held in the slow decay mode. Then, when the elapsed time reaches the end of the PWM cycle T, the determination result of step S30 is "YES" and the routine ends.

The variation of the measured current value Icoil at times t115 to t120, t128 to t130, and t137 to t140 illustrated in FIG. 7 is a specific example in which the charge mode is selected after the current control re-invalidation time Tce elapses and until the maximum duty time Tmax elapses and the slow decay mode is selected after the maximum duty time Tmax elapses and until the PWM cycle T elapses.

As described above, the motor current controller (100) according to this embodiment includes: an H-bridge circuit (20) that includes switching elements (2, 4, 6, and 8) and is connected to a motor coil (124) provided in a motor (120); and a control unit (101) that drives the switching elements (2, 4, 6, and 8) every predetermined PWM cycle and designates any operation mode of a charge mode in which a motor current (Icoil) flowing in the motor coil (124) increases and a decay mode (slow decay mode) in which the motor current (Icoil) is decreased for the H-bridge circuit (20), the control unit (101) includes an operation mode selector (S14, S18) that selects the decay mode as the operation mode when the motor current (Icoil) is equal to or greater than a reference current value (Iref) in a period in which a predetermined maximum duty time (Tmax) elapses after each PWM cycle starts, an invalidator (S24, S16) that sets a period from a time point at which a first predetermined time (Tce) elapses after the first PWM cycle starts to a time point at which a second predetermined time (Tcs) elapses after the subsequent second PWM cycle starts as an invalidation period (CLM=0) and disables an operation of the operation mode selector (S14, S18) in the invalidation period, a charge mode designator (S8, S12) that designates the operation mode to the charge mode in the invalidation period, and a maximum duty time designator (S26, S28) that selects the decay mode as the operation mode prior to the operations of the invalidator (S24, S16) and the charge mode designator (S8, S12) in a period in which the maximum duty time (Tmax) elapses from the start of each PWM cycle.

The maximum duty time designator (S26, S28) switches the operation mode from the charge mode to the decay mode with the lapse of the maximum duty time (Tmax) when the motor current (Icoil) is not equal to or greater than the reference current value (Iref) in the period in which the maximum duty time (Tmax) elapses after each PWM cycle starts.

The control unit (101) further includes an operation condition setting unit (S22) that sets an operation condition of the subsequent second PWM cycle from the time point at which the first predetermined time (Tce) elapses after the first PWM cycle starts to the time point at which the first PWM cycle ends. In specific Example 1 (FIG. 6), the first predetermined time (Tce) is equal to the maximum duty time (Tmax).

The motor current controller (100) further includes an excess signal output unit (111) that re-detects that the motor current (Icoil) exceeds the reference current value (Iref) after a predetermined blank time (Tb) elapses when it is detected that the motor current (Icoil) exceeds the reference current value (Iref), and outputs an excess signal (the CL of "1") after a predetermined deglitch time (Td) elapses after the re-detection, and the operation mode selector (S14, S18) switches the operation mode from the charge mode to the decay mode based on the excess signal (the CL of "1").

According to the above-mentioned configuration, the following advantages of the first embodiment are obtained.

(1) Since the motor control is performed using the single comparator 114 for the single stator winding 124 (see FIG. 2), it is possible to constitute the motor current controller 100.

(2) Since the current control is disabled until the current control invalidation time Tcs in the next PWM cycle elapses after the current control re-invalidation time Tce elapses, it is possible to suppress current ripples of the motor current. Accordingly, it is possible to enhance the driving efficiency of the motor 120 and to reduce torque loss, noise, vibration, and the like of the motor.

(3) Since the value of the threshold excess flag CL is inverted when the blank time Tb and/or the deglitch time Td elapses after the comparator signal CMP is switched, it is possible to remove an influence of chattering and to realize a stable operation.

A second embodiment of the present invention will be described below. The hardware condition and details of the rising side control routine (FIG. 8) in the second embodiment are the same as in the first embodiment. However, in the second embodiment, the current filter 111 (see FIG. 2) is not provided and the comparator signal CMP output from the comparator 114 is directly supplied to the CPU 101.

In the CPU 101, the function of the current filter 111 is realized by a software process based on the comparator signal CMP and the threshold excess flag CL is set. Therefore, details of the current filter loop routine of setting the threshold excess flag CL based on the comparator signal CMP will be described below with reference to FIG. 9. This routine is started on a process other than the rising side control routine (FIG. 8).

Figure 9:
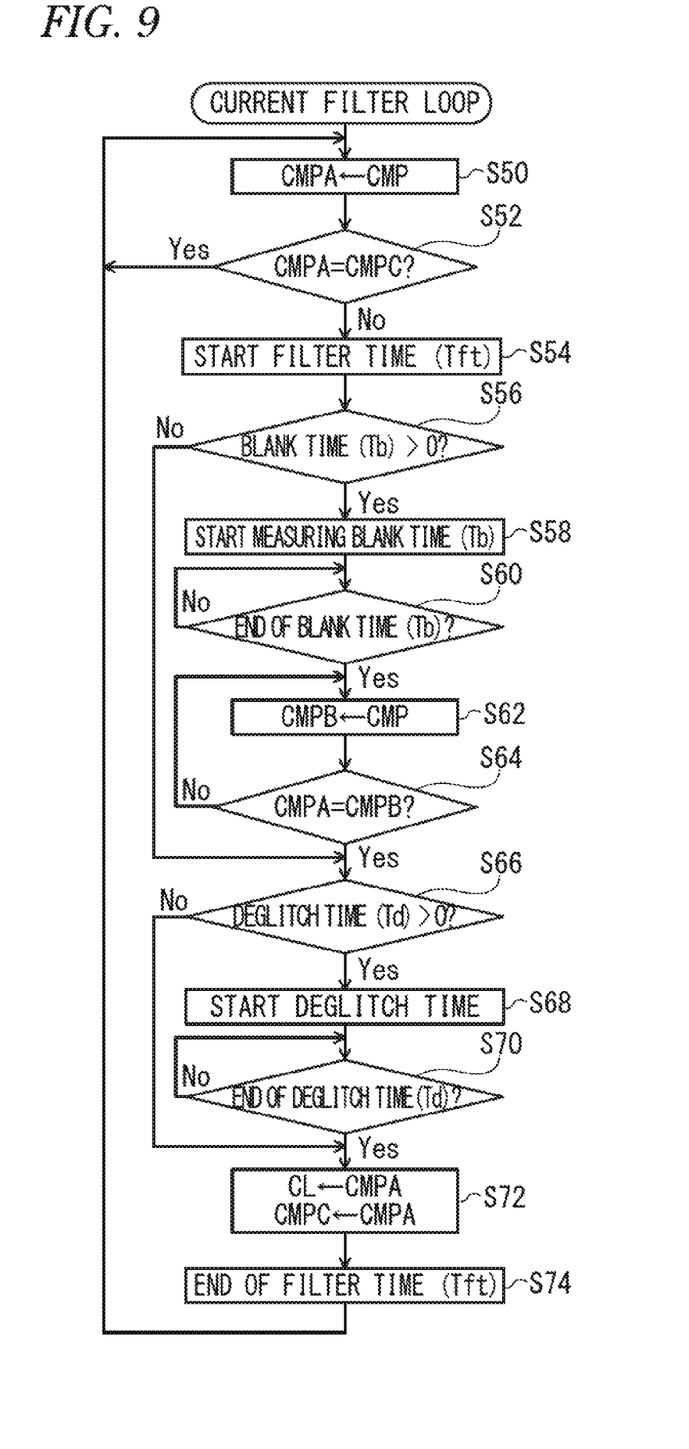
FIG. 9 is a flowchart of a current filter loop routine according to a second embodiment of the present invention.

In FIG. 9, in step S50, the present value of the comparator signal CMP is substituted for a variable CMPA. Then, in step S52, it is determined whether the variable CMPA is equal to a variable CMPC. The previous value of the comparator signal CMP is substituted for the variable CMPC. When the determination result of step S52 is "NO", the routine is returned to step S50. Thereafter, as long as the variable CMPC is equal to the variable CMPA, the loop of steps S50 and S52 is repeatedly performed.

In step S54, the filter time Tft starts. Then, in step S56, it is determined whether a predetermined blank time Tb exceeds 0. When the determination result is "YES", measuring of the blank time Tb is started in step S58. Then, in step S60, it is first determined whether the blank time Tb elapses from the timing at which the process of step S58 is performed.

When the determination result of step S60 is "NO", the routine waits until the blank time Tb elapses. When the blank time Tb elapses, the determination result of step S60 is "YES" and the routine proceeds to step S62. Here, the present value of the comparator signal CMP is substituted for the variable CMPB. Then, in step S64, it is determined whether the values of the variables CMPA and CMPB are equal to each other. When the determination result is "NO", the routine is returned to step S62 and the loop of steps S62 and S64 is repeatedly performed until the variables CMPA and CMPB are equal to each other.

The period in which this loop is repeatedly performed corresponds to the period of times t52 to t54 in section (b) of FIG. 3. When the variables CMPA and CMPB are equal to each other, the determination result of step S64 is "YES" and the routine proceeds to step S66. When the blank time Tb is 0, the determination result of step S56 is "NO" and the routine proceeds to step S66.

In step S66, it is determined whether a predetermined deglitch time Td is greater than 0. When the determination result is "YES", measuring of the deglitch time Td is started in step S68. Then, in step S70, it is first determined whether the deglitch time Td elapses from the timing at which the process of step S68 is performed.

When the determination result of step S70 is "NO", the routine waits until the deglitch time Td elapses. When the deglitch time Td elapses, the determination result of step S70 is "YES" and the routine proceeds to step S72. When the deglitch time Td is 0, the determination result of step S66 is "NO" and the routine proceeds to step S72.

In step S72, the value of the variable CMPA is set as the threshold excess flag CL. The value of the variable CMPA is substituted for the variable CMPC. Then, in step S74, the filter time Tft ends and the routine is returned to step S50. Thereafter, the same processes are repeated and the value of the threshold excess flag CL is toggled whenever the process of step S72 is performed.

As described above, according to this embodiment, in addition to the same advantages as in the first embodiment, since the current filter 111 as hardware is not necessary, it is possible to simplify the configuration of the motor current controller 100.

The present invention is limited to the above-mentioned embodiments, but can be modified in various forms. The above-mentioned embodiments are only examples for facilitating understanding of the present invention, and the present invention is not limited to the configurations having all the above-mentioned elements. A part of elements of a certain embodiment A can be replaced with the elements of the other embodiment, and the elements of the other embodiment may be added to the configuration of the embodiment A. Some elements of each embodiment may be deleted or may be additionally replaced with other elements. Examples of modifications of the above-mentioned embodiments include the followings.

(1) In the above-mentioned embodiments, the current control invalidation time Tcs, the current control re-invalidation time Tce, and the maximum duty time Tmax may not be constant. That is, the times may be set depending on the positional relationship (for example, the micro-step number) between the rotor 126 and the stators 122XP and 122XN.

(2) The routines illustrated in FIGS. 8 and 9 are described above as software routines using a program in the above-mentioned embodiments, but may be realized as hardware routines using an application specific integrated circuit (IC) (ASIC), a field-programmable gate array (FPGA), or the like.

(3) The FETs are applied as the switching elements constituting the H-bridge circuit 20 in the above-mentioned embodiments, bipolar transistors, insulating gate bipolar transistors (IGBTs), and other switching elements may be applied instead of the FETs.

(4) A bipolar two-phase stepping motor is applied as the motor 120 in the above-mentioned embodiments, but the type of the number of phases of the motor 120 can vary depending on the application thereof. The above-mentioned embodiments employ a micro-step system as a system of setting the reference current value Iref, but a value continuously varying with respect to the rotation angle θ may be used as the reference current value Iref.

According to the present invention, it is possible to enhance target value followability of a motor current with a low cost.

What is claimed is:

1. A motor current controller comprising:
an H-bridge circuit that includes a switching element and is connected to a motor coil provided in a motor; and
a control unit that drives the switching element every PWM cycle and designates an operation mode from among a plurality of modes including a charge mode, in which a motor current flowing in the motor coil increases, and a decay mode, in which the motor current is decreased for the H-bridge circuit,
wherein the control unit includes:
an operation mode selector that selects the decay mode as the operation mode when the motor current is equal to or greater than a reference current value in a period in which a predetermined maximum duty time elapses after each PWM cycle starts;
an invalidator that sets, as an invalidation period, a period from a time point at which a first predetermined time elapses after the first PWM cycle starts to a time point at which a second predetermined time elapses after the subsequent second PWM cycle starts, during which the selection of the decay mode by the operation mode selector is disabled;
a charge mode designator that designates the operation mode to the charge mode during the invalidation period; and
a maximum duty time designator that selects the decay mode as the operation mode with higher priority over the operations of the invalidator and the charge mode designator during a period in which the PWM cycle ends after the maximum duty time elapses from the start of each PWM cycle.

2. The motor current controller according to claim 1, wherein the maximum duty time designator switches the operation mode from the charge mode to the decay mode with the lapse of the maximum duty time when the motor current is not equal to or greater than the reference current value in the period in which the maximum duty time elapses after each PWM cycle starts.

3. The motor current controller according to claim 1, wherein the control unit further includes an operation condition setting unit that sets an operation condition of the second PWM cycle from the time point at which the first predetermined time elapses after the first PWM cycle starts to the time point at which the first PWM cycle ends.

4. The motor current controller according to claim 1, wherein the first predetermined time is equal to the maximum duty time.

5. The motor current controller according to claim 1 further comprising:
an excess signal output unit that re-detects that the motor current exceeds the reference current value after a predetermined blank time elapses when it is detected that the motor current exceeds the reference current value, and outputs an excess signal after a predetermined deglitch time elapses after the re-detection,
wherein the operation mode selector switches the operation mode from the charge mode to the decay mode based on the excess signal.

6. A method for controlling motor current of a motor current controller having an H-bridge circuit that includes a switching element and is connected to a motor coil provided in a motor and a control unit that drives the switching element every PWM cycle and designates an operation mode from among a plurality of modes including a charge mode, in which a motor current flowing in the motor coil increases, and a decay mode, in which the motor current is decreased for the H-bridge circuit, the method comprising:
selecting the decay mode as the operation mode when the motor current is equal to or greater than a reference current value in a period in which a predetermined maximum duty time elapses after each PWM cycle starts;
setting, as an invalidation period, a period from a time point at which a first predetermined time elapses after the first PWM cycle starts to a time point at which a second predetermined time elapses after the subsequent second PWM cycle starts, during which the selection of the decay mode is disabled;
designating the operation mode to the charge mode during the invalidation period; and
selecting the decay mode as the operation mode with higher priority over invalidation of the decay mode and the designation of the charge mode during a period in which the PWM cycle ends after the maximum duty time elapses from the start of each PWM cycle.

7. A motor current controller comprising:
an H-bridge circuit that includes a switching element and is connected to a motor coil provided in a motor; and
a controller that drives the switching element every PWM cycle and designates an operation mode from among a plurality of modes including a charge mode, in which a motor current flowing in the motor coil increases, and a decay mode, in which the motor current is decreased for the H-bridge circuit, the controller being configured to perform a series of process comprising:
selecting the decay mode as the operation mode when the motor current is equal to or greater than a reference current value in a period in which a predetermined maximum duty time elapses after each PWM cycle starts;
setting, as an invalidation period, a period from a time point at which a first predetermined time elapses after the first PWM cycle starts to a time point at which a second predetermined time elapses after the subsequent second PWM cycle starts, during which the selection of the decay mode is disabled;
designating the operation mode to the charge mode during the invalidation period; and
selecting the decay mode as the operation mode with higher priority over invalidation of the decay mode and the designation of the charge mode during a period in which the PWM cycle ends after the maximum duty time elapses from the start of each PWM cycle.

* * * * *